US007695176B2

(12) United States Patent
Ohtaki et al.

(10) Patent No.: US 7,695,176 B2
(45) Date of Patent: Apr. 13, 2010

(54) PROJECTION-TYPE VEHICLE HEADLAMP HAVING A LOUVERED COVER

(75) Inventors: Sumito Ohtaki, Shizuoka (JP); Kohji Shimakura, Shizuoka (JP); Noriyuki Konagai, Shizuoka (JP); Akinori Matsumoto, Shizuoka (JP); Tomoyuki Moritani, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 245 days.

(21) Appl. No.: 11/856,527

(22) Filed: Sep. 17, 2007

(65) Prior Publication Data

US 2008/0068854 A1 Mar. 20, 2008

(30) Foreign Application Priority Data

Sep. 19, 2006 (JP) ............................. 2006-252741

(51) Int. Cl.
*B60Q 1/04* (2006.01)
*F21V 11/02* (2006.01)

(52) U.S. Cl. ....................... 362/539; 362/517; 362/290; 362/297; 362/342; 362/346

(58) Field of Classification Search ................. 362/538, 362/539, 517, 290, 291, 292, 297, 342, 346
See application file for complete search history.

(56) References Cited

U.S. PATENT DOCUMENTS

| | | | | |
|---|---|---|---|---|
| 921,449 | A * | 5/1909 | Penney | 362/290 |
| 1,421,506 | A * | 7/1922 | Limpert | 362/291 |
| 1,446,891 | A * | 2/1923 | Fay | 362/291 |
| 3,079,529 | A * | 2/1963 | Novinger | 315/82 |
| 5,199,779 | A * | 4/1993 | Sato | 362/538 |
| 6,210,024 | B1 * | 4/2001 | Shida | 362/345 |

FOREIGN PATENT DOCUMENTS

| | | | |
|---|---|---|---|
| DE | 199 23 897 | A1 | 12/1999 |
| DE | 19923897 | A1 * | 12/1999 |
| JP | 2559908 | | 9/1996 |

OTHER PUBLICATIONS

Office Action issued in German Application No. 10 2007 044 581.6-54 dated May 15, 2009 and English translation thereof, 7 pages.
English abstract of Japanese Publication No. 4255602 published Sep. 10, 1992, esp@cenet database, 1 page.

* cited by examiner

*Primary Examiner*—Ismael Negron
(74) *Attorney, Agent, or Firm*—Osha • Liang LLP

(57) ABSTRACT

A projection-type vehicle headlamp includes a lamp body, a front cover forming a lamp housing together with the lamp body, a light projection unit accommodated inside the lamp body, and a cover extending in a forward direction from the light projection unit. A louver is formed on a portion of the cover where light from the light projection unit is irradiated so as to allow irradiated light to pass through the louver.

18 Claims, 4 Drawing Sheets

PROJECTION-TYPE VEHICLE HEADLAMP HAVING A LOUVERED COVER

CROSS-REFERENCE TO RELATED APPLICATIONS

The present invention claims priority from Japanese Patent Application No. 2006-252741 filed on Sep. 19, 2006, the entire content of which is incorporated herein by reference.

BACKGROUND OF INVENTION

1. Field of the Invention

The present invention relates to a projection-type vehicle headlamp including a light projection unit in which light from a light source is reflected by a ellipsoidal reflector and then is forwardly projected and distributed via a projection lens.

2. Background Art

As shown in FIG. 6, a projection-type vehicle headlamp includes a lamp body 1, a front cover 2 which forms a lamp housing together with the lamp body 1, and a light projection unit 3 accommodated inside the lamp housing. The light projection unit 3 includes a light source 3*a*, a reflector 3*b* having a substantially ellipsoidal shape, and a projection lens 3*c*, which are assembled together. Light from a light source is reflected by the reflector 3*b*, and then projected as a substantially parallel light via the projection lens 3*c*. The light is transmitted through the front cover 2, and is projected and distributed toward a front direction from the headlamp.

A vehicle body having a streamlined shape is recently becoming popular. Accordingly, the front cover 2 of the headlamp is formed such that a front surface 2*a* is greatly inclined in a rear direction so as to conform to the streamlined shape of the vehicle body 5. A cover 7 is arranged around the light projection unit 3, and a surface of the cover 7 is coated with a light reflecting film so that an inner side of the lamp housing is seen in a metallic color, thereby improving the appearance of the headlamp in a non-lighting condition (see, e.g., Japanese Patent No. 2559908).

However, according to the streamlined shape of the headlamp, there is a case where a space between the light projection unit 3 and the cover 7 in a vertical direction is small and the cover 7 is long in the forward direction. In such a case, a part of the light is likely to be irradiated directly toward the cover 7 and reflected, whereby harmful light, such as glare, is generated.

SUMMARY OF INVENTION

One or more embodiments of the invention prevent harmful light from being generated by a cover extending in a forward direction.

According to one or more embodiments of the invention, a projection-type vehicle headlamp includes a lamp body, a front cover forming a lamp housing together with the lamp body, a light projection unit accommodated inside the lamp body, and a cover extending in a forward direction from the light projection unit. A louver is formed on a portion of the cover where light from the light projection unit is irradiated, and the light passes through the louver.

Other aspects and advantages of the invention will be apparent from the following description and the appended claims.

DETAILED DESCRIPTION

Hereinafter, exemplary embodiments of the invention will be explained with reference to the drawings, the following exemplary embodiments do not limit the scope of the invention.

Figure 1:
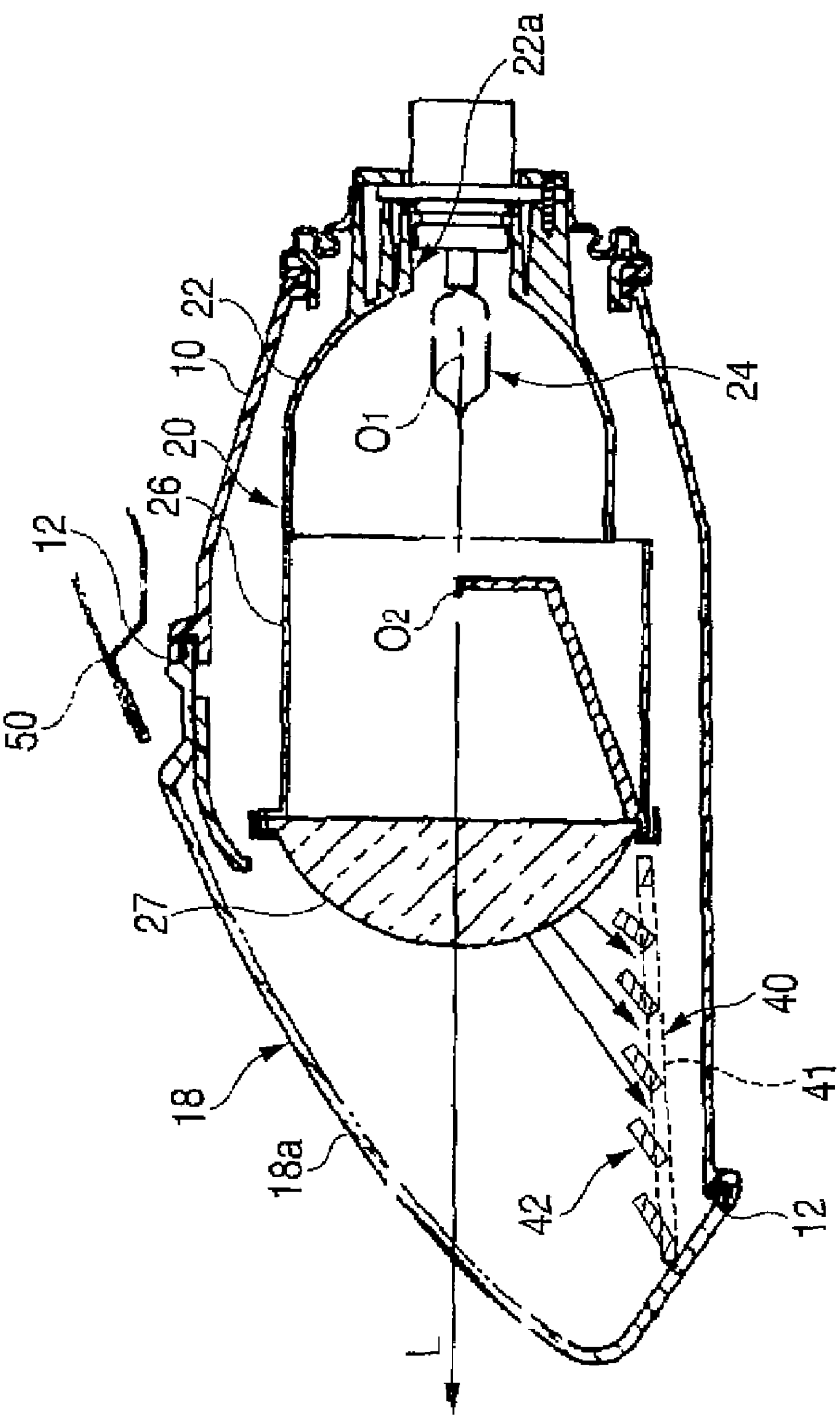
FIG. 1 is a longitudinal sectional view of a projection-type vehicle headlamp according to an exemplary embodiment of the invention.

A lamp body 10 shown in FIG. 1 has a shape of a rectangular container when seen from the front, and an opening having a shape of an obliquely upward rectangle is formed on a front side of the lamp body. A peripheral edge of the opening is formed with a sealing groove 12. A leg portion of a front cover 18 is engaged with the sealing groove 12 with a sealing agent disposed therebetween, whereby the front cover 18 and the lamp body 10 are assembled together. A front surface 18*a* of the front cover 18 is greatly inclined with respect to an upward direction so that a vertical section thereof has a streamline shape conforming to a shape of a body (a bonnet) 50 when the front cover 18 is assembled to the lamp body 10. A light projection unit 20 and a clearance lamp (not shown) are disposed adjacent to each other inside a lamp housing formed by the front cover 18 and the lamp body 10, and are integrally assembled as a headlamp.

The light projection unit 20 includes a ellipsoidal reflector 22 formed with a bulb insertion hole 22*a* on a rear top portion thereof, a bulb 24 inserted and attached into the bulb insertion hole 22*a* and serving as a light source of the headlamp, a lens holder 26 arranged on a front side of the reflector 22, and a projection lens 27 assembled to the lens holder 26. A filament of the bulb 24 is positioned in the vicinity of a first focal position O1 of the reflector 22, and a light from the bulb 24 is reflected by the reflector 22 toward the forward direction through a second focal point O2 of the reflector 22. The light becomes almost parallel light through the projection lens 27, and is then transmitted through the front cover 18 and is projected and distributed toward the forward direction from the headlamp.

An optical axis L of the light projection unit 20 can be adjusted by adjusting a tilt of the light projection unit 20 by means of an aiming mechanism.

A cover 40 extends around the projection lens 27, i.e., around a front end portion of the light projection unit 20. The cover 40 extends sideward from the light projection unit 20, and a reflector of the clearance lamp (not shown) is formed integrally with this sidewardly extending portion of the cover 40. In other words, the cover 40 and the reflector of the clearance lamp are formed in a one-piece structure by synthetic resin molding. A mirror finished surface having a metallic color is formed on a surface of the cover 40 and the reflector of the clearance lamp by aluminum deposition or chromium plating. A lower portion of the cover 40 extends from a position near the projection lens 27 to a position in the vicinity of a lower side portion of the front cover 18. Accordingly, a portion around the projection lens 27 becomes bright so that an appearance in a non-lighting condition is improved.

Figure 2:
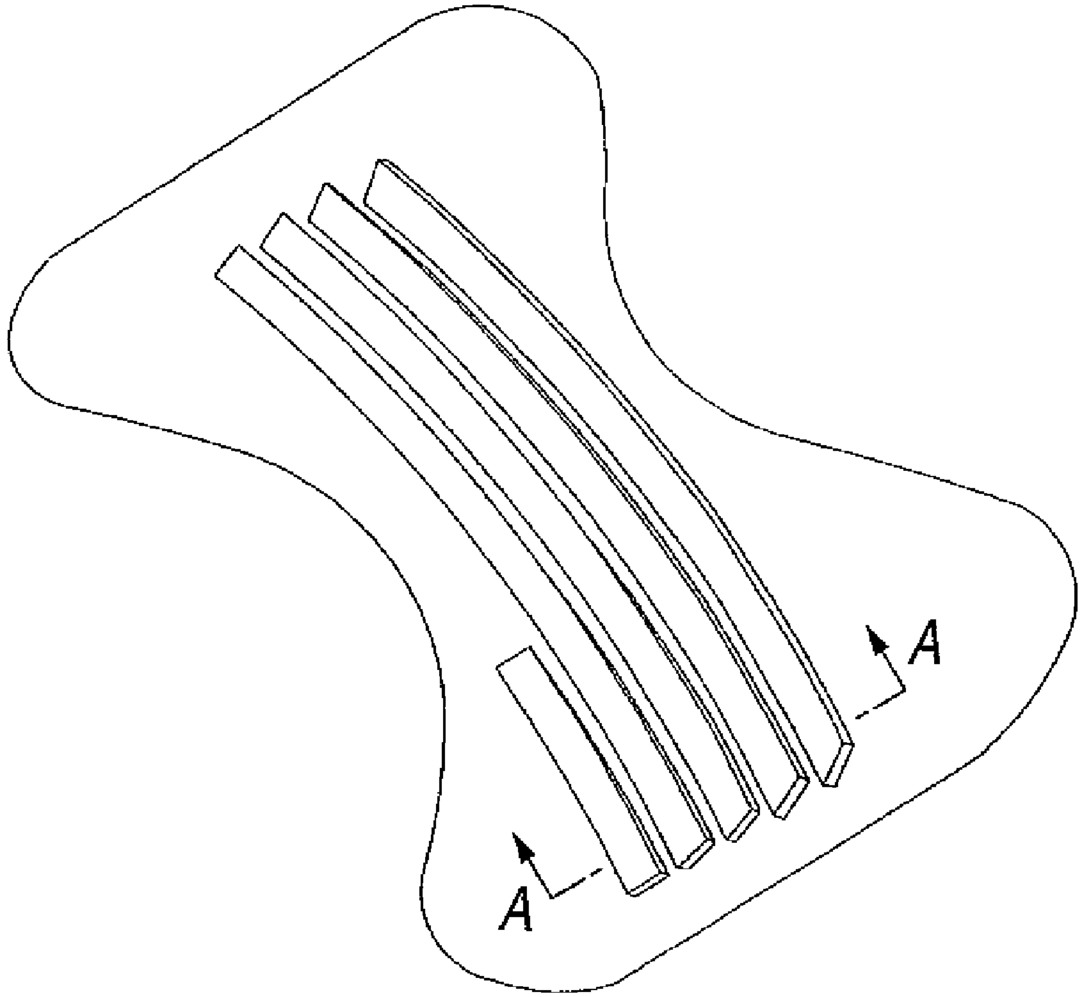
FIG. 2 is a partial enlarged perspective view of the louver shown in FIG. 1.
Figure 3:
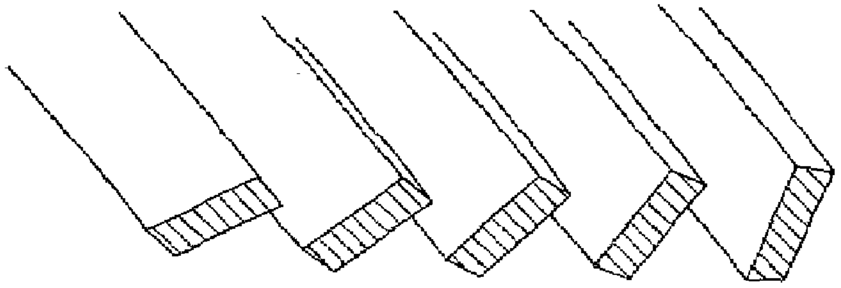
FIG. 3 is a perspective view showing a section of the louver taken along a line A-A shown in FIG. 2.

As shown in enlarged views of FIGS. 2 and 3, a forwardly extending portion 41 of the cover 40 is formed with a louver 42 by cutting out louver plates. Taking into consideration an incidence angle of the light incident on the cover 40 from the light projection unit 20, the cut out louver plates are raised toward the light projection unit 20. The louver plates are bent in a front-and-rear direction of the headlamp so as to have a convex shape. The light incident on the forwardly extending portion 41 of the cover 40 from the light projection unit 20 enters through respective gaps 43 between the louver plates of the louver 42, and the light thus entered is confined by the louver plates of the louver 42 and is prevented from being discharged to an outer side again. Accordingly, the light irradiated from the light projection unit 20 can be effectively prevented from being reflected by the forwardly extending portion 41. Thus, harmful light directed obliquely upward, such as glare, can be prevented from being generated.

In order to form the louver 42 in a region where the light from the light projection unit is irradiated, lengths of the respective louver plates do not have to be equal with each other (see FIG. 2). The louver 42 may be formed by pressing instead of cutting and raising. In such a case, respective ends of the louver plates are not cut so that the louver plates can be supported at their side surfaces, and the side surfaces can also prevent the light entered through the louver from leaking out. Moreover, according to the structure in which the louver plates are supported by their side surfaces, it is possible to avoid a change in an angle of the louver plates due to an aged deterioration or a deformation. When the louver is formed of a material having excellent ductility, such as aluminum, press working is preferable to cutting and raising. Because the louver 42 is disposed near the light projection unit 20 and stores light therein, it is preferable that the louver 42 be formed of aluminum, which has a higher heat resistance than the other parts of the forwardly extending portion 41 formed of a resin. In addition, it is possible to reduce weight of the louver 42 if it is formed of aluminum.

Figure 4:
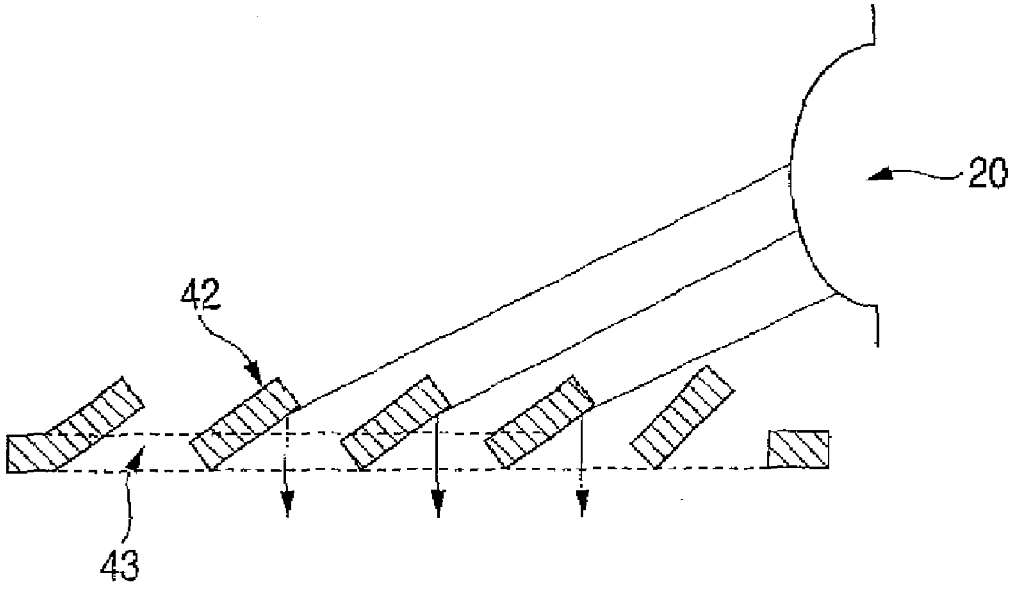
FIG. 4 is a view showing an optical path of light entering the louver.

The louver 42 is provided such that the light irradiated from the light projection unit 20 is led to a lower side of the cover 40. Thus, the light incident on the louver 42 is prevented from being discharged to the outer side again as a reflected light. An angle of each of the louver plates may be set to conform to an angle of the light incident thereon so that the light passes through along the angle of each of the louver plates. As shown in FIG. 4, the louver 42 may also be formed such that the light from the light projection unit 20 is reflected by rear surfaces of the louver plates 42 and is then directed downward.

Figure 5:
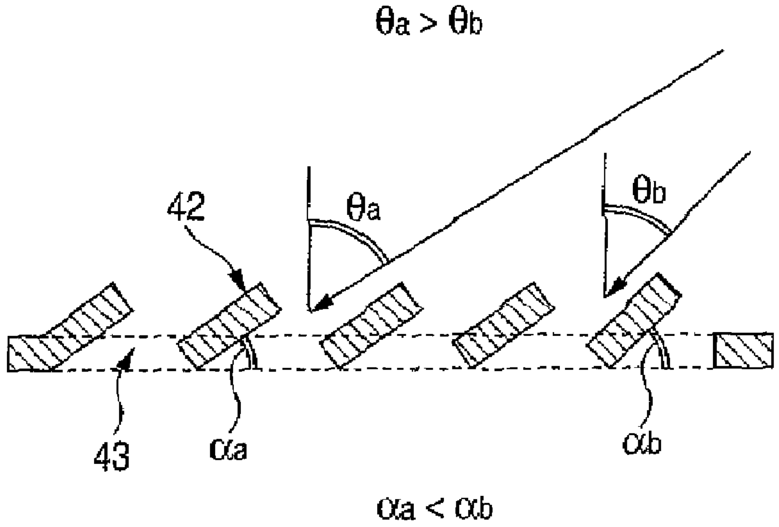
FIG. 5 is a longitudinal sectional view showing a detailed structure of the louver.
Figure 6:
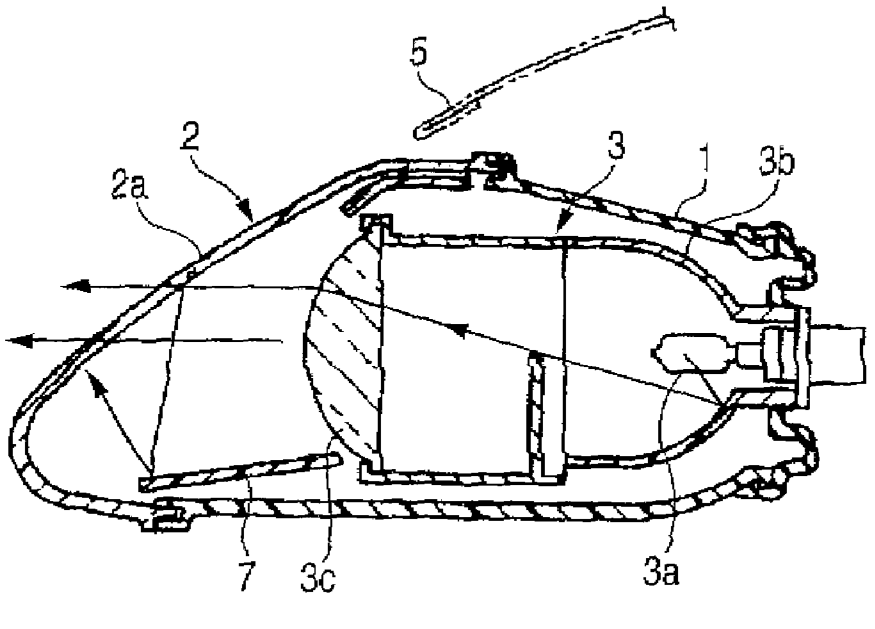
FIG. 6 is a longitudinal sectional view of a projection-type vehicle headlamp according to the related art.

As shown in FIG. 5, respective angles of the louver plates of the louvers 42 may be different. More specifically, an angle $\alpha$ of the louver plate may be set such that the angle $\alpha$ is larger on a side of the light projection unit 20, i.e., such that the angle $\alpha$ is smaller on a side away from the light projection unit 20. This is because the light irradiated from the light projection unit 20 and directed toward the forwardly extending portion 41 is incident at a steeper angle near the light projection unit 20 than the area away from light projection unit 20, i.e., an incidence angle $\theta$ is smaller on the side of the light projection unit 20 than the side away from the light projection unit 20. When the respective angles of the louver plates of the louvers 42 are set in accordance with the respective incidence angles, it is possible to efficiently lead the light irradiated from the light projection unit 20 through the louver 42 and confine the light by the louver plates of the louver 42.

An anti-reflection processing (e.g., an anti-reflection coating) may be partially provided on the louver 42 to efficiently prevent the light entering the louver 42 from being reflected again and discharged to the outer side. More specifically, such an anti-reflection processing may be performed on a lower side surface of the louver 42 while an upper side surface (a surface facing the front cover 18 in FIG. 1) of the louver 42 may be a mirror finished surface. In such a case, the lower side surface of the louver 42 has a lower reflectance than the upper side surface of the louver 42. Further, knurls may be disposed below the louver 42 to diffuse the light entering the louver 42, thereby preventing the light entering the louver 42 from being reflected again and discharged to the outer side.

According to one or more exemplary embodiments, it is possible to prevent harmful light, such as glare, from being generated by an upward reflection toward the front direction from the cover, even in a case where the light projection unit and the cover are disposed close to each other. Therefore, it is possible to dispose the light projection unit and the cover closer to each other, whereby a degree of freedom of a design is improved. As for the color of the cover, a dark color has been chosen in some cases in order to prevent the light irradiated from the light projection unit from being reflected by the cover. However, because the reflection by the cover can be suppressed efficiently according to one or more embodiments, it is possible to widen the degree of freedom of a color selection for the cover. Furthermore, because the light incident on the cover is positively taken in by matching the angles of the louver plates of the louver with the incidence angle of the light, it is possible to suppress the generation of harmful light more effectively than in a case where knurls are formed on the cover. Meanwhile, in the case in which a swivel mechanism is provided for irradiating light in accordance with a steering a steering angle, the light irradiated downward from the light projection unit is changed in various directions when swiveling is carried out. Therefore, it is difficult to predict glare, and knurls extending in a certain direction cannot appropriately deal with the light. However, according to one or more embodiments, because the light entering the louver is confined by the louver plates, it is possible to appropriately deal with the light changing in various directions.

While description has been made in connection with an exemplary embodiment of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A projection-type vehicle headlamp comprising:

a lamp body;

a front cover forming a lamp housing together with the lamp body;

a light projection unit accommodated inside the lamp body; and a second cover extending in a forward direction from the light projection unit, wherein a louver is formed on a portion of the second cover where light from the light projection unit is irradiated so as to allow irradiated light to pass through the louver, wherein the light projection unit comprises:

a reflector having a shape of an ellipsoid;

a light source attached to the reflector; and a projection lens disposed in front of the light source, and wherein light emitted from the light source is reflected by the reflector, and is irradiated in the forward direction via the projection lens.

2. A projection-type vehicle headlamp comprising:

a lamp body:

a front cover forming a lamp housing together with the lamp body;

a light projection unit accommodated inside the lamp body; and a second cover extending in a forward direction from the light projection unit, wherein a louver is formed on a portion of the second cover where light from the light projection unit is irradiated so as to allow irradiated light to pass through the louver, and wherein the second cover is disposed such that the irradiated light passes through the louver toward a lower side of the second cover and is prevented from being incident on the front cover.

3. A projection-type vehicle headlamp comprising:

a lamp body;

a front cover forming a lamp housing together with the lamp body;

a light projection unit accommodated inside the lamp body; and a second cover extending in a forward direction from the light projection unit, wherein a louver is formed on a portion of the second cover where light from the light projection unit is irradiated so as to allow irradiated light to pass through the louver, and wherein the louver is configured to reflect a portion of the light from the light projection unit downwards.

4. The projection-type vehicle headlamp according to claim 3, wherein an antireflection coating is formed on a portion of the louver.

5. The projection-type vehicle headlamp according to claim 3, wherein the light projection unit comprises:

a reflector having a shape of an ellipsoid;

a light source attached to the reflector; and a projection lens disposed in front of the light source, wherein light emitted from the light source is reflected by the reflector, and is irradiated in the forward direction via the projection lens.

6. The projection-type vehicle headlamp according to claim 3, wherein a front surface of the front cover is inclined toward a rear direction such that at least a portion of the front surface is more horizontal than vertical.

7. The projection-type vehicle headlamp according to claim 3, wherein the second cover comprises a forwardly extending portion at a lower portion thereof, and wherein the louver is formed directly on the forwardly extending portion.

8. The projection-type vehicle headlamp according to claim 3, wherein the second cover includes a mirror finished surface.

9. The projection-type vehicle headlamp according to claim 3, wherein the louver comprises a plurality of louver plates raised upward toward the light projection unit, and wherein a raising angle of at least one of the plurality of louver plates is set to conform to an angle of light incident thereon.

10. The projection-type vehicle headlamp according to claim 3, wherein the louver comprises a plurality of louver plates raised upward toward the light projection unit, and wherein a raising angle of at least one of the plurality of louver plates is different from another of the plurality of louver plates.

11. The projection-type vehicle headlamp according to claim 3, wherein the louver comprises an upper side surface facing the front cover and a lower side surface, wherein the lower side surface has a lower reflectance than an upper side surface.

12. The projection-type vehicle headlamp according to claim 3, wherein the louver comprises a plurality of louver plates raised upward toward the light projection unit, wherein a raising angle of one of the plurality of louver plates is larger than a raising angle of another one of the plurality of louver plates, and wherein the another one of the plurality of louver plates is farther away from the light projection unit than the one of the plurality of louver plates.

13. The projection-type vehicle headlamp according to claim 12, wherein an antireflection coating is formed on a portion of the plurality of louver plates.

14. The projection-type vehicle headlamp according to claim 12, wherein at least one of the plurality louver plates has a different length from another of the plurality of louver plates.

15. The projection-type vehicle headlamp according to claim 12, wherein the raising angle of at least one of the plurality of louver plates is set to conform to an angle of light incident thereon.

16. The projection-type vehicle headlamp according to claim 12, wherein the raising angle of at least one of the plurality of louver plates is different from another of the plurality of louver plates.

17. The projection-type vehicle headlamp according to claim 12, wherein each of the plurality of louver plates is bent in a front-and-rear direction of the headlamp.

18. The projection-type vehicle headlamp according to claim 17, wherein each of the plurality of louver plates is bent so as to have a convex shape.

* * * * *